No. 810,814. PATENTED JAN. 23, 1906.
A. P. SANTINI.
BICYCLE ATTACHMENT.
APPLICATION FILED APR. 4, 1905.
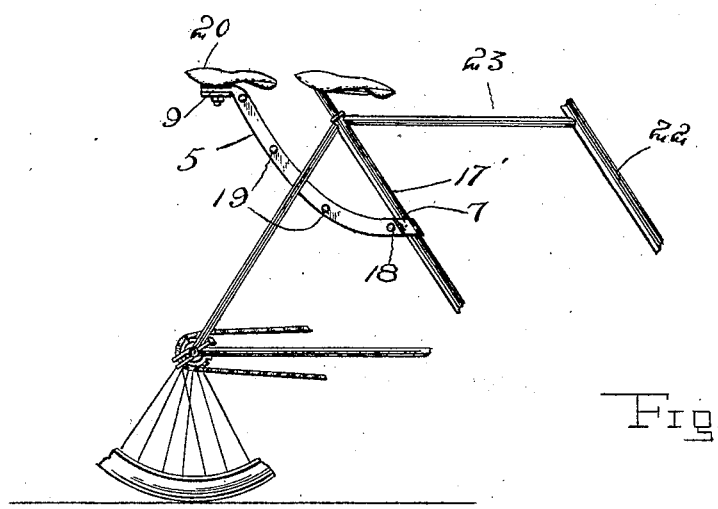
Fig. I
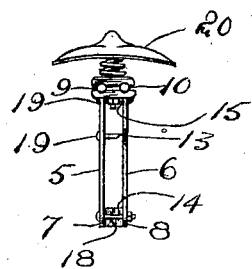
Fig. 2
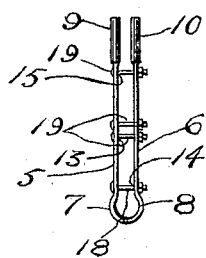
Fig. 3
Inventor
Adolphus P. Santini

UNITED STATES PATENT OFFICE.

ADOLPHUS P. SANTINI, OF BUENAVISTA, FLORIDA.

BICYCLE ATTACHMENT.

No. 810,814.　　　Specification of Letters Patent.　　　Patented Jan. 23, 1906.

Application filed April 4, 1905. Serial No. 253,815.

*To all whom it may concern:*

Be it known that I, ADOLPHUS P. SANTINI, a citizen of the United States, residing at Buenavista, in the county of Dade, State of Florida, have invented certain new and useful Improvements in Bicycle Attachments; and I do hereby declare the following to be a full, clear, and exact description of the invention, such as will enable others skilled in the art to which it appertains to make and use the same.

This invention relates to supplemental seats for bicycles, the object of the invention being to provide a cheap and simple arrangement that may be attached to the seat-tube of the bicycle-frame, so that the extra passenger may sit behind the person operating the bicycle, or may be attached to the head of the bicycle-frame, so that the extra passenger may sit in front of the person operating the bicycle.

In the drawings forming a portion of this specification, and in which like numerals of reference indicate similar parts in the several views, Figure 1 is a side elevation showing a portion of a bicycle equipped with a supplemental seat embodying the present invention. Fig. 2 is a rear elevation of the supplemental seat detached from the bicycle. Fig. 3 is a plan view of the bracket of the supplemental seat.

Referring now to the drawings, the present attachment comprises two members 5 and 6, each formed of strap metal. The lower end of each member is curved in one direction, as shown at 7 and 8, respectively, while the upper end of each member is bent abruptly in the opposite direction, as shown at 9 and 10, respectively, so that when these portions are placed side by side they will coincide. The extremities of the portions 7 and 8 of the members 5 and 6 are hinged together, and directly adjacent to the hinge they are arched outwardly, as illustrated in Fig. 3 of the drawings. Thus all parts of each member, with the exception of the arched portion, are in a common plane, through the body portions of the members 5 and 6 are formed alining perforations 13, through the portions 7 and 8 are formed alining perforations 14, and through the portions 9 and 10 are formed perforations 15.

The bracket is applied to the frame of a bicycle in such manner that the seat-tube 17' thereof will be received between the portions 7 and 8 and against the hinge connecting them, the seat-tube being clamped between said portions by a bolt 18, that is engaged through the perforation 14. Other bolts 19 are engaged through the perforations 13, while a seat 20 is secured upon the members 9 and 10 by bolts engaged through the perforations 15. If desired, the portions 9 and 10 may be rounded to receive the ordinary bicycle-saddle. In the position just decribed the seat or saddle 20 will be in the rear of the regular seat or saddle 20 of the bicycle. It will be understood that instead of attaching the bracket to the seat-tube of the bicycle-frame it may be attached to the head 22 of the frame, at which time the top bar 23 of the frame will be received between the members 5 and 6.

It will be understood that in practice modifications of the specific construction shown may be made and any suitable materials and proportions may be used for the various parts without departing from the spirit of the invention.

What is claimed is—

1. A supplemental seat for bicycles including two members having their lower end portions turned in one direction and hinged together and having their opposite ends turned in the opposite direction and adapted to receive a saddle, and means for holding said members with their hinged end portions in clamping relation.

2. A supplemental seat for bicycles comprising two members having each one end turned laterally and hinged to the corresponding end of the other member, the opposite end of each member being bent laterally in the opposite direction, a saddle removably secured to the last-named laterally-bent portions, and clamping-bolts passed through the members and adapted to hold their hinged end portions in clamping relation.

In testimony whereof I affix my signature in presence of two witnesses.

ADOLPHUS P. SANTINI.

Witnesses:
　Z. T. MERRITT,
　A. F. MERRITT.